US 8,650,604 B2

(12) United States Patent
Hsu et al.

(10) Patent No.: US 8,650,604 B2
(45) Date of Patent: Feb. 11, 2014

(54) METHOD AND SYSTEM FOR SYNCHRONIZATION OF AUDIO/VIDEO (A/V) STREAM FORMAT CHANGE IN WIRELESS COMMUNICATION SYSTEMS

(75) Inventors: Ju-Lan Hsu, San Jose, CA (US);
Huai-Rong Shao, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 47 days.

(21) Appl. No.: 13/282,402

(22) Filed: Oct. 26, 2011

(65) Prior Publication Data

US 2012/0133827 A1 May 31, 2012

Related U.S. Application Data

(60) Provisional application No. 61/407,396, filed on Oct. 27, 2010.

(51) Int. Cl.
*H04N 7/173* (2011.01)
*H04N 7/20* (2006.01)
*H04J 3/16* (2006.01)
*H04J 3/22* (2006.01)
*H04H 20/71* (2008.01)
*H04N 7/01* (2006.01)
*H04N 11/20* (2006.01)

(52) U.S. Cl.
USPC .............. 725/105; 725/67; 725/68; 725/118; 725/131; 725/139; 725/148; 725/151; 725/81; 370/466; 455/3.03; 348/441; 348/E5.011

(58) Field of Classification Search
USPC .............. 725/62, 105, 67, 68, 114, 118, 116, 725/131, 139, 148, 151, 144, 81; 709/201; 370/466; 455/3.03; 345/603; 348/441, 348/E5.011
See application file for complete search history.

(56) References Cited

U.S. PATENT DOCUMENTS

| 7,034,916 | B2 * | 4/2006 | Bubie et al. ..................... 352/40 |
| 7,861,272 | B2 | 12/2010 | Russ et al. |
| 8,156,238 | B2 * | 4/2012 | Kobayashi .................... 709/231 |
| 8,189,504 | B2 * | 5/2012 | Becker et al. ................. 370/316 |
| 8,392,365 | B2 * | 3/2013 | Feliberti et al. ............... 707/614 |
| 2005/0013281 | A1 * | 1/2005 | Milton et al. ................. 370/349 |
| 2006/0031889 | A1 * | 2/2006 | Bennett et al. ................. 725/80 |
| 2006/0114987 | A1 | 6/2006 | Roman |

(Continued)

OTHER PUBLICATIONS

Broadcom Corporation et al., "WirelessHD Specification Overview," Overview of WirelessHD Specification Version 1.0a, Aug. 27, 2009, pp. 1-77, WirelessHD LLC, USA.

(Continued)

*Primary Examiner* — Pinkal R Chokshi
(74) *Attorney, Agent, or Firm* — Kenneth L. Sherman, Esq.; Michael Zarrabian, Esq.; Sherman & Zarrabian LLP (57) ABSTRACT

A protocol for wireless transmission of audio/video (A/V) information is provided. The protocol includes sending a request message from a requester to a responder for changing A/V format of an A/V stream transmission between the requester and the responder over a wireless communication medium. In reply to the request message, sending a response message from the responder to the requester for synchronizing the A/V format change. The requester and the responder changing the A/V format of the A/V stream in synchrony.

51 Claims, 8 Drawing Sheets

(56) References Cited

U.S. PATENT DOCUMENTS

| | | | |
|---|---|---|---|
| 2007/0011344 A1* | 1/2007 | Paka et al. | 709/231 |
| 2007/0150592 A1* | 6/2007 | Bell | 709/226 |
| 2007/0208767 A1* | 9/2007 | Cotichini | 707/101 |
| 2008/0109653 A1* | 5/2008 | Yokohama | 713/156 |
| 2008/0168519 A1 | 7/2008 | Rao et al. | |
| 2008/0205270 A1* | 8/2008 | Kasheff et al. | 370/232 |
| 2009/0201988 A1 | 8/2009 | Gazier et al. | |
| 2009/0241147 A1* | 9/2009 | Kim et al. | 725/62 |
| 2012/0076049 A1* | 3/2012 | Rudolf et al. | 370/254 |
| 2012/0120813 A1* | 5/2012 | Johansson et al. | 370/249 |
| 2013/0002820 A1* | 1/2013 | Francisco | 348/43 |
| 2013/0100897 A1* | 4/2013 | Negus | 370/329 |

OTHER PUBLICATIONS

International Search Report and Written Opinion dated May 30, 2012 for International Application No. PCT/KR2011/008096 from Korean Intellectual Property Office, pp. 1-9, Seo-gu, Daejeon, Republic of Korea.

\* cited by examiner

| | TransactionID | StreamID | A/V Config | FrameNumber |
|---|---|---|---|---|
| Octets: | 1 | 1 | | 1 |

|        | TransactionID | Result | FrameNumber |
|--------|---------------|--------|-------------|
| Octets: | 1            | 1      | 1           |

METHOD AND SYSTEM FOR SYNCHRONIZATION OF AUDIO/VIDEO (A/V) STREAM FORMAT CHANGE IN WIRELESS COMMUNICATION SYSTEMS

RELATED APPLICATION

This application claims the benefit of U.S. Provisional Patent Application Ser. No. 61/407,396, filed on Oct. 27, 2010, incorporated herein by reference.

FIELD OF THE INVENTION

The present invention relates generally to wireless communication, and in particular to synchronization of Audio/Video (A/V) stream formats in wireless communication systems.

BACKGROUND OF THE INVENTION

In audio/video (A/V) information transmission in a wireless communication system, a wireless communication medium is lossy, error prone and typically subject to dynamic wireless channel conditions. The changes in a wireless link quality affect the capacity of the wireless link and data rate of a A/V stream while in transport between an A/V source and an A/V sink. Further, changes in stream format for an A/V stream while in transport affect the quality of service.

BRIEF SUMMARY OF THE INVENTION

A method and system for wireless transmission of audio/video (A/V) information, is provided. One embodiment comprises sending a request message from a requester to a responder for changing A/V format of an A/V stream transmission between the requester and the responder over a wireless communication medium. In reply to the request message, sending a response message from the responder to the requester for synchronizing the A/V format change. And, the requester and the responder changing the A/V format of the A/V stream in synchrony.

These and other features, aspects and advantages of the present invention will become understood with reference to the following description, appended claims and accompanying figures.

DETAILED DESCRIPTION OF THE INVENTION

Embodiments of the invention relate to format change in wireless communication systems. Embodiments of the invention provide a synchronization mechanism (i.e., synchronization protocol or synchronization mechanism) wherein change of stream format is signaled between the A/V source and A/V sink, and the format change takes place in a synchronized manner to ensure smooth transitions between format changes. Embodiments of the invention provide synchronization for stream format change in a wireless communication system such as a wireless network (e.g., local wireless area network).

In one embodiment of the invention, a wireless communication system comprises wireless stations configured for communication via a wireless communication medium such as one or more radio frequency (RF) channels (i.e., wireless channel). A wireless channel provides a wireless communication link (i.e., wireless link). To address changes in wireless link quality that affect the capacity of the wireless link, embodiments of the invention provide an adaptation mechanism to adapt transmission rate of data such as an A/V stream, while in transport over a wireless link between wireless stations (e.g., an A/V source wireless station and an A/C sink wireless stations).

Embodiments of the invention provide a stream format change synchronization protocol for A/V stream format change between an A/V source in a wireless transmitter station and an A/V sink in a wireless receiver station. The time to change the format is negotiated and agreed upon between the A/V source and A/V sink, while any resulting wireless transmission delay and/or processing delays are also accounted for. The timing information may take multiple forms such as an absolute time format, a relative time reference, or a certain time window period.

In one embodiment, the invention provides format change signaling process between the wireless transmitter (source) and the wireless receiver (sink). In most scenarios, this process involves a request and response message exchange or a notification and acknowledge (ACK) message exchange between the two entities (e.g., wireless stations such as a transmitter and a receiver). In one implementation of the invention, both source and sink entities may request stream format changes. The requesting entity is referred to as the requester and the responding entity is referred to as the responder.

In one implementation of the invention, the source has information about the A/V format communication capabilities of the sink but the sink does not have information about the A/V format communication capabilities of the source. In one embodiment, A/V format defines the format of the A/V bit stream from a transmitter, and therefore given a bit stream, a receiver knows how to parse the bit stream into meaningful A/V data. If the A/V data is uncompressed A/V, the A/V format may specify, e.g., picture size, color space, bit depth (number of bits per color), frame rate, etc. As such, the sink may not directly request to change to a certain A/V format which it does not know whether the source supports that A/V format or not.

On the other hand, the sink has more channel condition information than the source and may request to adapt the A/V format based on the wireless channel condition. In this case, the request of format change and the decision of the new A/V format are decomposed into a two-step process: First, the sink sends a request (to the source) to adapt, subject to certain requirements. The source, if accepting the request, then decides a new A/V format according to the information feedback from the sink. Embodiments of the invention are applicable whether the A/V format change process is decomposed as above or not.

Not all format changes involve the above mentioned message exchanges between the source and the sink. When the A/V format information is embedded in A/V data packets (such as in packet header fields or in the payloads as syntax) and the format change does not require additional time to prepare at the sink side, the source may make dynamic format changes and simply indicate so in the data packets.

In one embodiment of the present invention, a frame structure is used for data packet/frame transmission between wireless stations such as a transmitter wireless station and a receiver wireless station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

Figure 1:
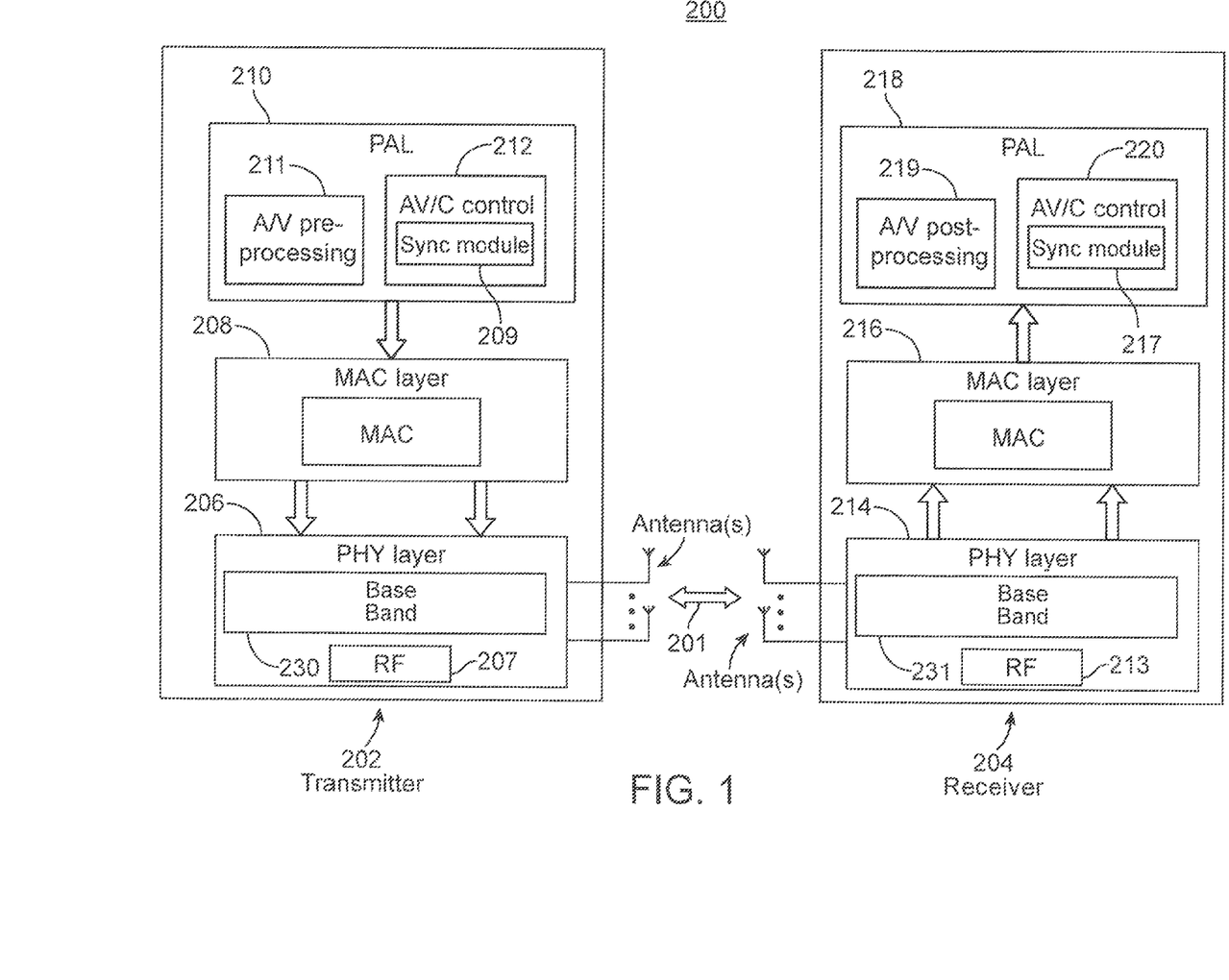
FIG. 1 shows a block diagram of an example wireless communication network system, implementing a synchronization mechanism according to an embodiment of the invention.

FIG. 1 shows a block diagram of an example wireless communication network system 200, implementing a synchronization mechanism according to an embodiment of the invention. The system 200 includes a wireless transmitter station 202 and a wireless receiver station 204, for wireless data communication, such as wireless transmission of audio/video information over a radio frequency channel 201. The system 200 may include a wireless coordinator device that facilitates communications in the network.

The transmitter 202 includes a PHY layer 206, a MAC layer 208, and a Protocol Adaptation Layer (PAL) 210. The PHY layer 206 includes a radio frequency (RF) communication module 207 for transmitting/receiving signals under control of a baseband process module 230. The baseband process module 230 allows communicating control information and other information.

The PAL 210 includes an audio/visual (A/V) pre-processing module 211 for packetizing video streams, which are then converted to MAC packets by the MAC layer 208. The PAL 210 further includes an AV/C control module 212 which sends stream transmission requests and control commands to reserve radio frequency channel time blocks for transmission of packets. The AV/C control module 212 includes a synchronization module 209 which implements a synchronization protocol for A/V stream format change according to embodiments of the invention. In one embodiment, the transmitter 202 further includes hardware processor, memory, logic, integrated circuits, etc. (not shown) as part of the PHY layer, configured according to embodiments of the present invention.

The wireless receiver station 204 includes a PHY layer 214, a MAC layer 216, and a PAL 218. The PHY layer 214 includes a RF communication module 213 which transmits/receives signals under control of a baseband process module 231. The PAL 218 includes an A/V post-processing module 219 for de-packetizing the video information in the MAC packets into streams, received by the MAC layer 216.

The de-packetizing is reverse of the packetization by A/V pre-processing module 211 in the PAL 210 of wireless transmitter station 202. The PAL 218 further includes an AV/C control module 220 which handles stream control and channel access. Beamforming transmissions may be performed over multiple channels. The AV/C control module 220 includes a synchronization module 217 which implements a synchronization protocol for A/V stream format change according to embodiments of the invention. The MAC/PHY layers may perform antenna training and beaming switching control for directional transmission such as beamforming communications. In one embodiment, the receiver 204 further includes hardware processor, memory, logic, integrated circuits, etc. (not shown) as part of the PHY layer, configured according to embodiments of the present invention.

An example implementation of the invention in the system 200 for mmWave wireless communication such as for a 60 GHz frequency band wireless network is useful with WiGig applications (e.g., client types, including A/V equipment, network devices, PCs and handhelds). An example WiGig network utilizes a 60 GHz-band mmWave technology to support a physical (PHY) layer data transmission rate of multi-Gbps (gigabits per second).

Embodiments of the invention provide a mechanism to adapt the data rate of the A/V stream (e.g., data packets) while in transport. Change of the stream format is signaled between the A/V source and A/V sink, and the format change take places in a synchronized manner to ensure smooth transitions, according to embodiments of the invention. Several embodiments of the invention are disclosed below. In certain embodiments of the invention, not all A/V format information is embedded in data packets. In certain embodiments of the invention, all A/V format information is embedded in data packets. Embodiments of the invention provide synchronization to support smooth and seamless format change between the A/V source and A/V sink, specially when changes in a wireless link quality affect the capacity of the wireless link.

A/V Format Information is not Embedded in Data Packets

In certain embodiments of the invention, not all A/V format information is embedded in the data packets that make up an A/V stream. A message exchange is performed over the wireless channel between an A/V source and an A/V sink to learn about the new A/V format and when the new A/V format change takes place. In one embodiment of the invention, described below, it is assumed that the wireless transmission delay is fixed. In another embodiment of the invention, described below, it is assumed that there is random wireless transmission delay.

Deterministic Wireless Transmission Delay

Figure 2A:
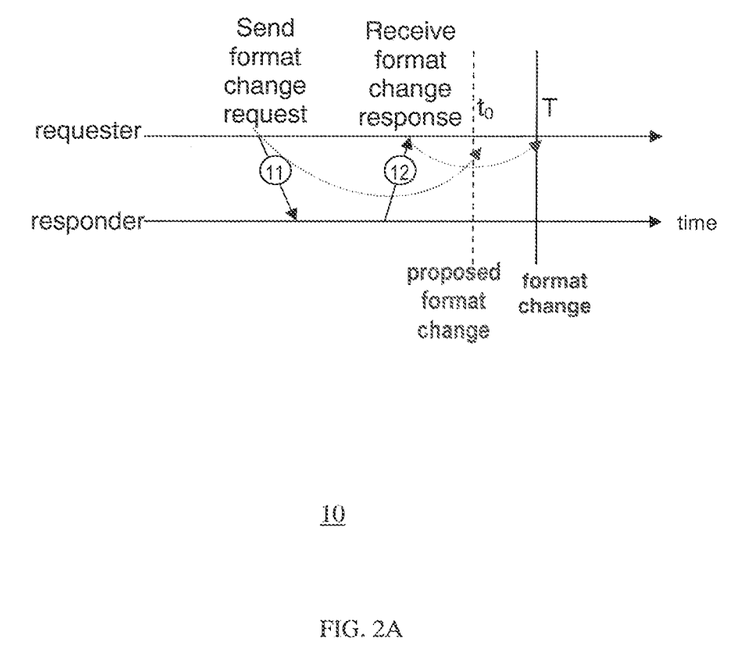
FIG. 2A shows an example A/V stream format change timeline, wherein it is assumed there is a deterministic (e.g., fixed) wireless transmission delay, according to an embodiment of the invention.
Figure 2B:
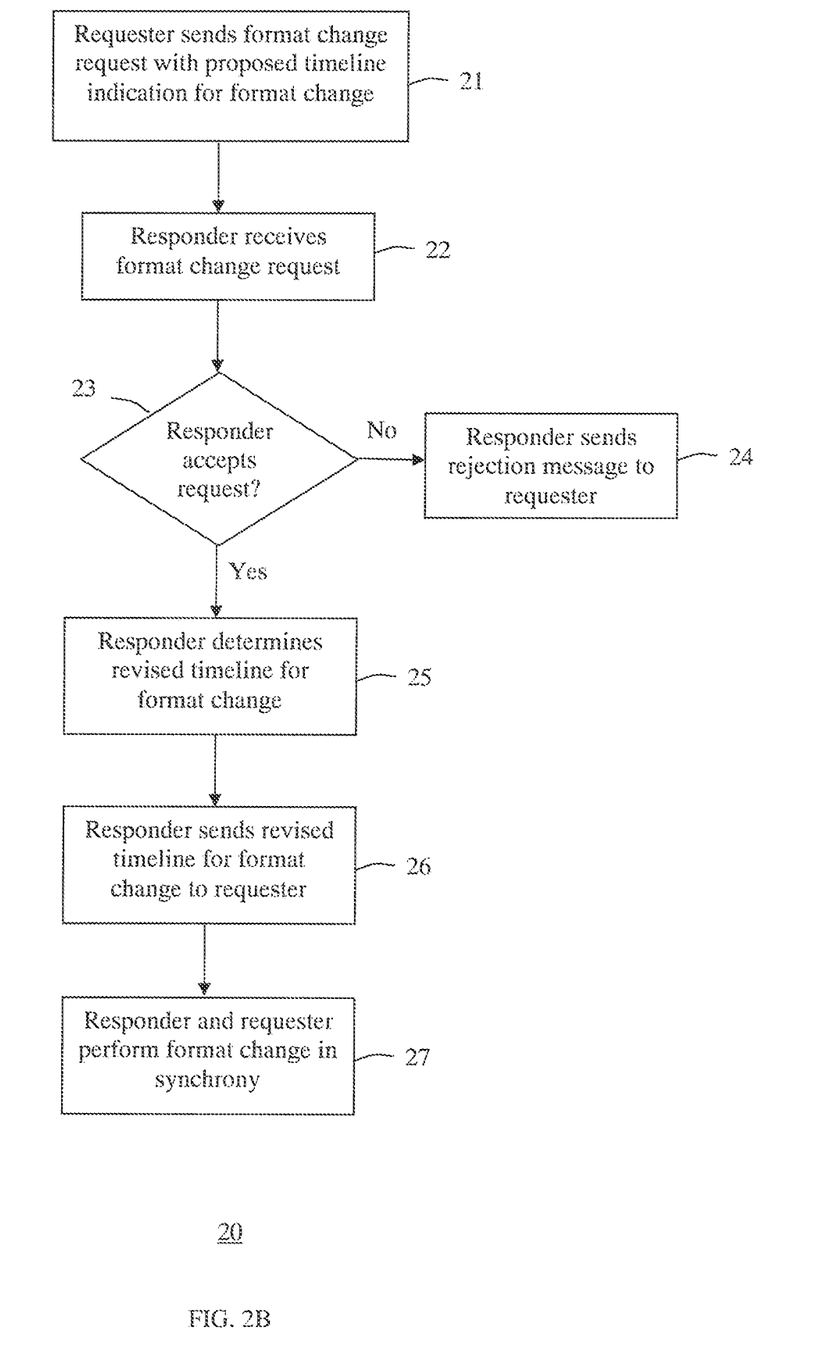
FIG. 2B shows process for A/V stream format change, according to an embodiment of the invention.

FIG. 2A shows an example stream format change timeline 10, according to an embodiment of the invention, wherein it is assumed there is a deterministic (e.g., fixed) wireless transmission delay Dw between a wireless A/V sink device and a wireless A/V source device. FIG. 2B shows a synchronization process 20 for stream format change, corresponding to FIG. 2A, according to an embodiment of the invention.

Referring to FIG. 2B in conjunction with FIG. 2A, in process block 21, a requester (e.g., wireless station 202 in FIG. 1) sends a format change request 11 to a responder (e.g., wireless station 204 in FIG. 1) with a format switch (change) indication.

A format switch (change) indication $t_0$ in the message 11 indicates a proposed time for format change as signaled (i.e., format change timing request) by the requester, and T indicates a revised time for format change in reply to the request by the responder. The $t_0$ indication may be implemented in different ways. For example, the $t_0$ indication may represent a video frame number (or sequence number), rather than a specific clock time, at which a format change should take place. The $t_0$ indication is in a stream format request message 11 to request a format change at a proposed time point (e.g., $t_0$). The proposed time is selected such that the requester is capable of making the switch to a new format in time.

In process block 22, upon receiving of the stream format request message (i.e., message frame 11), the responder processes the request and determines whether to accept the request. In process block 23, if the request is denied, the responder will send a rejection message to the requester in process block 24.

If the request is accepted (successful), in process block 25 the responder determines a timeline for the format change. In one embodiment of the invention, the responder determines a revised timeline which is equal to or later than the proposed timeline. In one implementation, the revised timeline T (i.e., format change timing response) is generally selected by the responder according to the following procedure:

a. The responder calculates a time t such that the responder is capable switching to the new format before time t.
b. Assuming the fixed wireless transmission delay is Dw, the responder compares time t with the proposed timeline $t_0$ from the requester to determine T, such that:
If $(t+Dw)>t_0$, then select a time $T \geq (t+Dw)$,
else, select a time $T \geq t_0$.

In process block 26, the responder sends the revised timeline T back to the requester (via the stream format response message 12), to notify the requester of the time (or video frame number, etc.) at which the responder can switch to the new stream format.

Upon receiving the stream format response (response message frame 12), the requester and responder can change (switch) to the new format at the same time T in synchrony, in process block 27.

The response message should be received by the requester within a bounded time for a response message to be considered valid. Otherwise, the request is considered unsuccessful (invalid) and the requester needs to start over the request procedure.

In one embodiment of the invention, upon receiving the response message, the requester may send an ACK (either in the MAC or Protocol Adaptation Layer (PAL)) to the responder. If the ACK message is not received by the responder, the process is considered unsuccessful and the responder does not perform a format change. This allows selecting the latter timeline T required by the requester and the responder, and thus ensures accurate and manageable behavior upon stream format change.

In one implementation of the invention, the messaging/communication turn-around time for synchronization is accounted for at the responder in order to process the request and generate a response message, by adjusting the proposed time of the requester to include that turn-around time.

In one embodiment of the invention, the wireless transmission delay is neglected and Dw is set to value 0. In another embodiment of the invention, the requester may not have any requirement on the format change time. As such, the format switch (change) indication $t_0$ can be set to 0, and the requester need not send the $t_0$ information in the request message.

In another embodiment of the invention, the responder may not have any requirement on the format change time. Time t can be set to 0, and the responder need not send the T indication in the response frame 12. An application of this scenario is when the A/V sink takes a long period to prepare for format change while the A/V source does not require as long a period. This is applicable where the A/V sink, as a requester, directly selects a timeline and sends a format change notification to the A/V source, as a responder, to initiate the format change. In all cases at least one of the requester and responder provides format change timing information in their respective request and response messages. The requester may function as an A/V source or an A/V sink, and the responder may function as an A/V source or an A/V sink.

Non-Deterministic Wireless Transmission Delay

According to an embodiment of the invention, for non-deterministic wireless transmission delay between a requester (e.g., A/V sink) and a responder (e.g., A/V source), the above process for fixed wireless transmission delay is modified to account for random wireless transmission delay in calculating a feasible timeline between the requester and responder. In the following, two approaches for non-deterministic wireless transmission delay according to embodiments of the invention are described as Bounded RTT (Round Trip Time) approach and Time Allowance approach.

Bounded RTT (Round Trip Time) Approach

Figure 3:
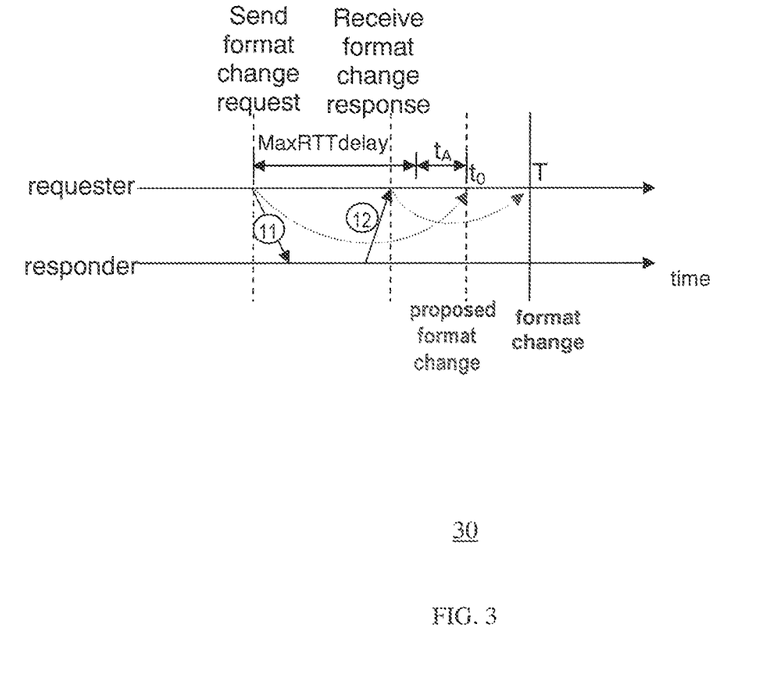
FIG. 3 shows an example A/V stream format change timeline, wherein it is assumed there is bounded, non-deterministic wireless transmission delay, according to an embodiment of the invention.

FIG. 3 shows an example stream format change timeline 30, according to an embodiment of the invention, assuming non-zero wireless transmission delay, according to an embodiment of the Invention. A requester (e.g., wireless station 204 in FIG. 1) sends a format change request 11 to a responder (e.g., wireless station 202 in FIG. 1). According to an embodiment of the invention, a stream format change protocol specifies a maximum Round Trip Time (RTT) delay parameter or constant, MaxRTTdelay, by which time a stream format change response must be received by a requester for the stream format change process to be valid. As shown in FIG. 3, the requester then adds sufficient time allowance ($t_A$) to the MaxRTTdelay as its proposed format change time $t_0$.

The responder, upon receiving of the stream format request message 11, the responder processes the request and determines whether to accept the request. If the request is rejected, the responder informs the requester via a message 12.

If the request is accepted (successful), the responder will revise the timeline which is equal to or later than the requester's proposed timeline $t_0$. In one embodiment of the invention, the revised timeline T is generally selected by the following procedure:

a. The responder calculates a time t such that the responder is able to make the switch before time t.
b. Compare time t with the original proposed time $t_0$ from requester:
If $t > t_0$, then select a time $T \geq t$,
Else, select a time $T \geq$ time $t_0$.

The responder sends the revised timeline T in the stream format response message 12 back to the requester, to notify the requester at what time to change format. The response message should be received by the requester within a bounded time for a response message to be considered valid. Otherwise, the request is considered unsuccessful (invalid) and the requester needs to start over the request procedure. Upon receipt of the response message, the requester sends an ACK (either in the MAC or PAL layer) to the responder. If the ACK message is not received by the responder, the process is considered unsuccessful and the responder does not perform a format change.

In one embodiment of the invention, the requester may not have any requirement on the format change time. Time allowance $t_A$ can be set to 0, and the requester need not send the $t_A$ information in the request frame, but sends a timestamp. In another embodiment, the responder may not have any requirement on the format change time. Time t can be set to 0, and the responder need not send the T indication in the response frame 12. At least one of the requester and responder includes timing information in their respective request and response messages.

Time Allowance Approach

Figure 4:
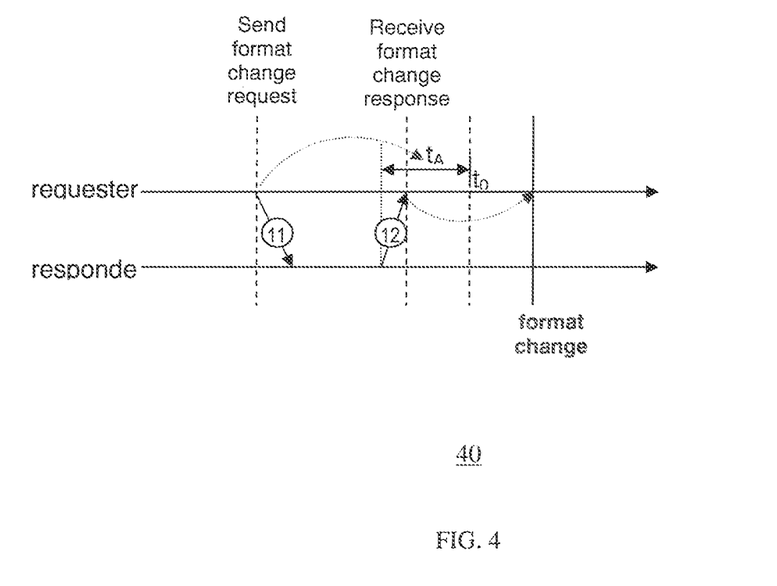
FIG. 4 shows another example A/V stream format change timeline, according to an embodiment of the invention.

According to an embodiment of the Invention, instead of proposing an absolute timeline, the requester proposes a time allowance $t_A$ in the stream format change request 11 to the responder. The responder utilizes the proposed time allowance in determining the revised timeline T. In one example, the responder follows a procedure to select the timeline T as follows:

a. Calculate a time t, such that the responder is able to make the switch before time t.
b. Calculate a time $t_0$ given by: $t_0 = t_p + t_A + \epsilon$, where $t_p$ is the current time point as the responder processes the response, and $\epsilon$ represents other time factors (if any).
c. Compare time t with time $t_0$:
If time t>time $t_0$, then select a time≥time t,
Else, select a time T≥time $t_0$.

FIG. 4 shows an example stream format change timeline 40 (Time allowance approach), assuming non-zero wireless transmission delay, according to an embodiment of the invention. The responder sends the revised timeline T in the stream format response message 12 back to the requester, to notify the requester at what time to change format. The response message 12 should be received by the requester within a bounded time for a response message to be considered valid. Otherwise, the request is considered unsuccessful (invalid) and the requester needs to start over the request procedure. Upon receipt of the response message, the requester sends an ACK (either in the MAC or PAL layer) to the responder. If the ACK message is not received by the responder, the process is considered unsuccessful and the responder doesn't perform format change. This approach eliminates partial uncertainty of the transmission delay. To account for return trip transmission delay, a certain return trip time allowance $t_R$ in timeline selected by the responder is utilized, such that the final selected timeline $T'=T+t_R$.

In one embodiment of the invention, the requester may have a fixed requirement on the format change time, known to both the requester and the responder. Time allowance $t_A$ can be set to the fixed value (0 is a special case), and the requester need not send the $t_A$ information in the request frame 11. In another embodiment, the responder may have a fixed requirement on the format change time, and time t can be set to the fixed value (0 is a special case). At least one of the requester and responder includes timing information in their respective request and response messages.

A/V Format Information is Embedded in Data Packets

In one embodiment of the invention, the relevant A/V format information is embedded in the stream data packets, and a message exchange between the requester and responder (e.g., source and sink) occurs when at least one of the requester and responder requires extra time or resource to prepare for the format change. In one implementation of the invention, the requester and responder use similar procedures as discussed above to synchronize the time of format change.

In another embodiment of the invention, the requester and responder need not agree on an exact time value at which the format change takes place. Instead, a time window is specified and used. In that case, the synchronization protocol according to an embodiment of the invention specifies a constant (or parameter) maxFormatChangeDelay, by which a valid format change may take place upon a successful format change process.

For example, the starting point of a time window may be the time when the requester sends the request 11, the time when the responder sends the response 12, or the time when the requestor receives the response 12. If the time window is designed to account for format change preparation duration by the responder, the responder should only send the response when it is ready to change the format. After the specified time window of maxFormatChangeDelay duration, the granted format change expires and the requester must start the request process over. At any moment in time, there should not be more than one outstanding successful format change between the responder and receiver for a single A/V stream.

Example Applications

Figure 5A:
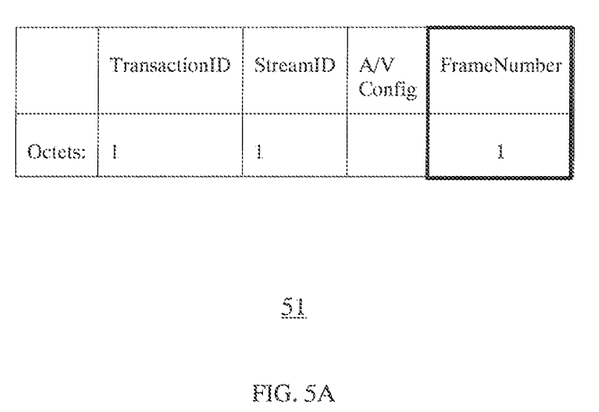
FIG. 5A shows an A/V format change request, according to an embodiment of the invention.

In one implementation of the Invention, a FrameNumber field is added to a stream format change request message 11, as illustrated by a stream format change request frame 51 shown in FIG. 5A. The FrameNumber in the request frame 15 represents the proposed timeline by the requester, at which video frame stream format change should take place in synchrony by the requester and the responder. Alternatively, a Presentation Time Stamp (PTS) field or other equivalent time indicative fields (ins place of the FrameNumber field or a new field) may be used to indicate the proposed timeline for changing the stream format. In one implementation, the request frame 51 is useful with wireless networks in accordance with Wireless Gigabit Alliance (WiGig) standards.

Figure 5B:
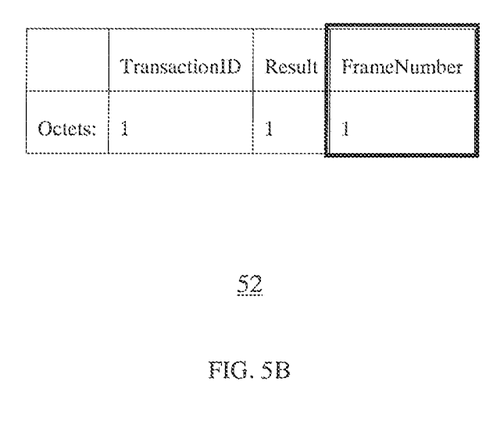
FIG. 5B shows an A/V format change request, according to an embodiment of the invention.

In one implementation of the invention, similarly a FrameNumber field is inserted to the stream format change response frame 12, as shown by the stream format change response frame 52 in FIG. 5B. In one implementation, the response frame 52 is useful with wireless networks according to the Wireless Gigabit Alliance (WiGig) standards. The FrameNumber field represents the revised or final selected video frame number for changing stream format, made by the responder, if the format change request is successful. When the request is not successful (indicated by the Result field of the Stream format change response frame), the value in the FrameNumber field is not interpreted.

If a time allowance approach is used, as discussed above, the stream format change request 11 may include a relative FrameNumber field (in place of the FrameNumber field in FIG. 5A) which dictates the requested time allowance in units of number of video frames.

Embodiments of the invention provide a method and system for stream format change by selecting a feasible timeline between a requester and responder. Embodiments of the invention provide a method and system for stream format change by accounting for partial of complete wireless transmission delay of over-the-air signaling. Embodiments of the invention provide a method and system for stream format change by allowing a bounded time window during which a valid stream format change may take place. Embodiments of the invention allow selection of a feasible stream format change time for both requester and responder.

An example application of the invention is for Wireless Gigabit Alliance (WiGig). WiGig applies to multi-gigabit speed wireless communications technology operating over the 60 GHz radio frequency band. WiGig is an industry-led effort to define a wireless digital network interface specification for wireless signal transmission on the 60 GHz frequency band and higher for wireless local area networks and wireless local area network devices such as consumer electronics (CE) and other electronic devices including wireless radios.

Embodiments of the invention have been described with reference to flowchart illustrations and/or block diagrams of methods, apparatus (systems) and computer program products according to embodiments of the Invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the Invention. In alternative implementations, the functions noted in the blocks may occur out of the order noted in the figures, concurrently, etc.

Figure 6:
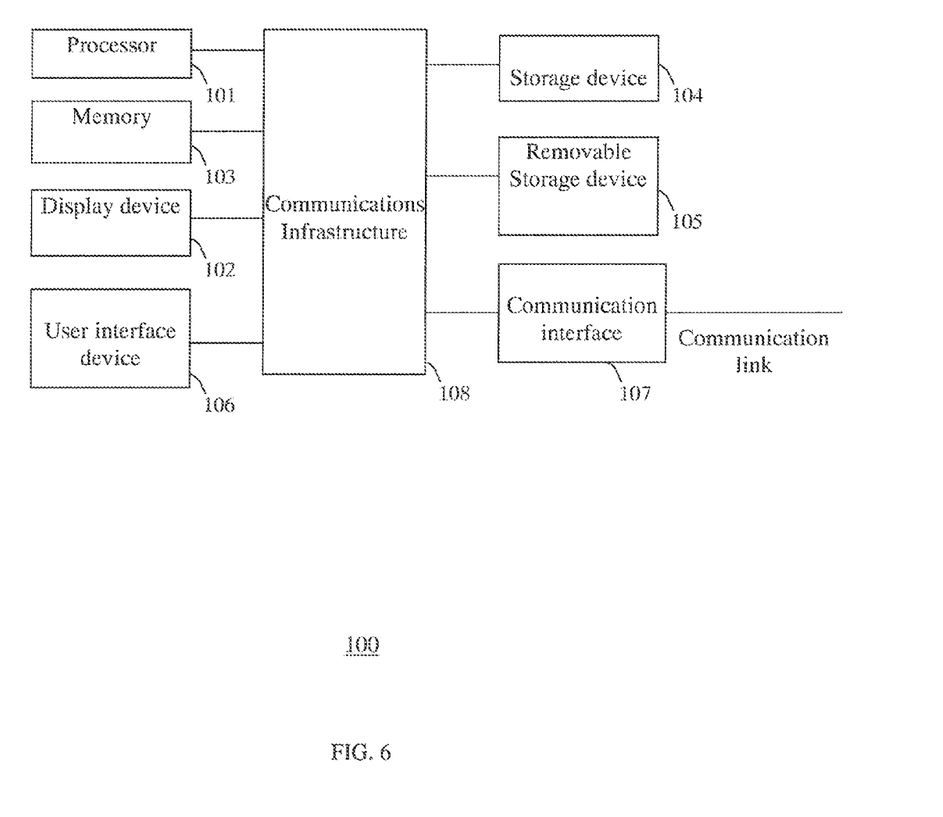
FIG. 6 shows a high level block diagram showing an information processing system comprising a computer system useful for implementing an embodiment of the invention.

FIG. 6 is a high level block diagram showing an information processing system comprising a computer system 100 useful for implementing an embodiment of the Invention. The computer system 100 includes one or more processors 101, and can further include an electronic display device 102 (for displaying graphics, text, and other data), a main memory 103 (e.g., random access memory (RAM)), a storage device 104 (e.g., hard disk drive), a removable storage device 105 (e.g., a removable storage drive, a removable memory module, a magnetic tape drive, an optical disk drive, a computer readable medium having stored therein computer software and/or data), a user interface device 106 (e.g., keyboard, touch screen, keypad, pointing device), and a communication interface 107 (e.g., a modem, a network interface [such as an Ethernet card], a communications port, or a PCMCIA slot and card). The communication interface 107 allows software and data to be transferred between the computer system and external devices. The system 100 further includes a communications infrastructure 108 (e.g., a communications bus, crossover bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the Invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message frames, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the Invention as discussed herein. In particular, the computer programs, when executed, enable the processor multi-core processor to perform the features of the computer system. Accordingly, such computer programs represent controllers of the computer system.

Though the Invention has been described with reference to certain versions thereof; however, other versions are possible. Therefore, the spirit and scope of the Invention should not be limited to the description of the preferred versions contained herein.

What is claimed is:

1. A method for wireless transmission of audio/video (A/V) information, the method comprising:
    sending a request message from a requester to a responder for changing A/V format of an A/V stream transmission between the requester and the responder over a wireless communication medium, wherein the request message comprises a proposed timing indication for changing the A/V format;
    in reply to the request message, sending a response message from the responder to the requester for synchronizing the A/V format change;
    the requester and the responder changing the A/V format of the A/V stream in synchrony, wherein a timeline for changing the A/V format is selected between the responder and the requester;
    wherein the proposed timing indication comprises a timing window, and the requester and the responder changing the A/V format of the A/V stream within the timing window.

2. The method of claim 1, wherein:
    the request message includes a timing request including a proposed time for changing the A/V format.

3. The method of claim 2, wherein:
    the response message includes a timing response for changing the A/V format;
    the requester and the responder change the A/V format of the A/V stream in synchrony based on said timing response.

4. The method of claim 3, further comprising:
    determining said timing response based on said timing request.

5. The method of claim 3, further comprising:
    determining said format change timing response based on said timing request and a fixed delay between sending the request and receiving of the response.

6. The method of claim 3, further comprising:
determining said format change timing response based on said timing request and a bounded round trip time delay between sending the request and receiving of the response.

7. The method of claim 3, further comprising:
determining said format change timing response based on said timing request, message processing time at the responder, and a bounded round trip time delay between sending the request and receiving of the response.

8. The method of claim 1, further comprising:
the requester and the responder negotiating the time to change the format by accounting for wireless transmission delays and processing delays.

9. The method of claim 8, wherein:
format change timing is based on absolute time format.

10. The method of claim 8, wherein:
format change timing is based on a relative time reference.

11. The method of claim 1, wherein:
the request message includes a frame number field indicating a video frame number at which format change is to take place; and
the response message includes a frame number field indicating a selected video frame number at which format change is to take place.

12. The method of claim 1, wherein:
the request message includes a time stamp field indicating a proposed time point for changing the said stream format.

13. The method of claim 1, wherein:
the requester comprises a wireless station; and
the responder comprises a wireless station.

14. The method of claim 13, wherein the wireless communication comprises mmWave communication over radio frequency channels.

15. A wireless communication system for wireless transmission of audio/video (A/V) information, comprising:
a requester comprising a physical (PHY) layer for wireless communication over a wireless communication medium;
a responder comprising a physical (PHY) layer for wireless communication over said wireless communication medium;
said requester further comprising a synchronization module that sends a request message to said responder for changing A/V format of an A/V stream transmission between the requester and the responder over the wireless communication medium, wherein the request message comprises a proposed timing for changing the A/V format; and
said responder further comprising a synchronization module that in reply to the request message, sends a response message to the requester for synchronizing the A/V format change;
wherein the synchronization module of the requester and the synchronization module of the responder change the A/V format of the A/V stream in synchrony,
wherein a timeline for changing the A/V format is selected between the responder and the requester;
wherein the proposed timing comprises a timing window, and the requester and the responder changing the A/V format of the A/V stream within the timing window.

16. The system of claim 15, wherein:
the proposed timing for changing the A/V format comprises a first proposed timestamp for a synchronized time for changing the A/V format.

17. The system of claim 16, wherein:
the response message includes a timing response for changing the A/V format;
the synchronization module of the requester and the synchronization module of the responder change the A/V format of the A/V stream in synchrony based on said timing response.

18. The system of claim 17, wherein:
the synchronization module of the responder determines said timing response based on said timing request.

19. The system of claim 17, wherein:
the synchronization module of the responder determines said format change timing response based on said timing request and a fixed delay between sending the request and receiving of the response.

20. The system of claim 17, wherein:
the synchronization module of the responder determines said format change timing response based on said timing request and a bounded round trip time delay between sending the request and receiving of the response.

21. The system of claim 17, wherein:
the synchronization module of the responder determines said format change timing response based on said timing request, message processing time at the responder, and a bounded round trip time delay between sending the request and receiving of the response.

22. The system of claim 15, wherein:
the synchronization modules of the requester and the responder negotiate the time to change the format by accounting for wireless transmission delays and processing delays.

23. The system of claim 22, wherein:
format change timing is based on absolute time format.

24. The system of claim 22, wherein:
format change timing is based on a relative time reference.

25. The system of claim 15, wherein:
the request message includes a frame number field indicating a video frame number at which format change is to take place; and
the response message includes a frame number field indicating a selected video frame number at which format change is to take place.

26. The system of claim 15, wherein:
the request message includes a time stamp field indicating a time point for changing the said stream format.

27. The system of claim 15, wherein:
the requester comprises a wireless station; and
the responder comprises a wireless station.

28. The system of claim 27, wherein the wireless communication comprises mmWave communication over radio frequency channels.

29. A requester device for wireless transmission of audio/video (A/V) information, comprising:
a physical (PHY) layer for wireless communication over a wireless communication medium; and
a protocol adaptation layer that sends a request message to a responder device for changing A/V format of an A/V stream transmission between the requester device and the responder device over the wireless communication medium, wherein the request message comprises a proposed timing for changing the A/V format;
the protocol adaptation layer configured to receive a response message from the responder for synchronizing the A/V format change;
wherein the protocol adaptation layer changes the A/V format of the A/V stream in synchrony with the responder device, wherein a timeline for changing the A/V format is selected between the responder device and the requester device,
wherein the proposed timing comprises a timing window, and the requester and the responder changing the A/V format of the A/V stream within the timing window.

30. The requester device of claim 29, wherein:
the proposed timing for changing the A/V format comprises a timestamp indicating a proposed time for a synchronized A/V format change;
the protocol adaptation layer changes the A/V format of the A/V stream in synchrony with the responder device based on said timing response.

31. The requester device of claim 29, wherein:
the requester device and the responder device negotiate the time to change the format by accounting for wireless transmission delays and processing delays.

32. The requester device of claim 31, wherein:
format change timing is based on absolute time format.

33. The requester device of claim 32, wherein:
format change timing is based on a relative time reference.

34. The requester device of claim 29, wherein:
the request message includes a frame number field indicating a video frame number at which format change is to take place; and
the response message includes a frame number field indicating a selected video frame number at which format change is to take place.

35. The requester device of claim 29, wherein:
the request message includes a time stamp field indicating a time point for changing the said stream format.

36. The requester device of claim 29, wherein:
the requester device comprises a wireless communication station; and
the responder device comprises a wireless communication station.

37. The requester device of claim 36, wherein the wireless communication comprises mmWave communication over radio frequency channels.

38. A wireless responder device for wireless transmission of audio/video (A/V) information, comprising:
a physical (PHY) layer for wireless communication over a wireless communication medium; and
a protocol adaptation layer that receives a request message from a requester device for changing A/V format of an A/V stream transmission between the requester device and the responder device over the wireless communication medium, wherein the request message comprises a proposed timing for changing the A/V format;
the protocol adaptation layer configured to send a response message to the requester device for synchronizing the A/V format change;
wherein the protocol adaptation layer changes the A/V format of the A/V stream in synchrony with the requester device,
wherein a timeline for changing the A/V format is selected between the responder device and the requester device,
wherein the proposed timing comprises a timing window, and the requester and the responder changing the A/V format of the A/V stream within the timing window.

39. The responder device of claim 38, wherein:
the proposed timing for changing the A/V format comprises a proposed time indication for a synchronized A/V format change between the requester device and the responder device.

40. The responder device of claim 39, wherein:
the response message includes a timing response for changing the A/V format;
the protocol adaptation layer changes the A/V format of the A/V stream in synchrony with the requester device based on said timing response.

41. The responder device of claim 40, wherein:
the protocol adaptation layer determines said timing response based on said timing request.

42. The responder device of claim 40, wherein:
the protocol adaptation layer determines said format change timing response based on said timing request and a fixed delay between sending the request and receiving of the response.

43. The responder device of claim 40, wherein:
the protocol adaptation layer determines said format change timing response based on said timing request and a bounded round trip time delay between sending the request and receiving of the response.

44. The responder device of claim 40, wherein:
the protocol adaptation layer determines said format change timing response based on said timing request, message processing time at the responder, and a bounded round trip time delay between sending the request and receiving of the response.

45. The responder device of 38, wherein:
the requester comprises a wireless station;
the responder comprises a wireless station;
the wireless communication comprises mmWave communication over radio frequency channels.

46. The method of claim 1, wherein the response message includes a revised time indication for changing the A/V format.

47. The method of claim 46, wherein the response message includes a time indication for when a synchronized A/V format change occurs for the requester and the responder.

48. The system of claim 15, wherein the response message includes a second proposed timestamp for revising the synchronized time for changing the A/V format.

49. The method of claim 12, wherein the requester and the responder changing the A/V format of the A/V stream in synchrony at the proposed time point.

50. The method of claim 1, wherein changing the A/V format comprises changing the format of the A/V stream based on channel condition.

51. The method of claim 1, wherein changing the A/V format comprises changing the format of the A/V stream for adapting a data rate of the A/V stream.

* * * * *